(12) United States Patent
Ito

(10) Patent No.: US 12,384,466 B2
(45) Date of Patent: Aug. 12, 2025

(54) VEHICLE BODY PILLAR STRUCTURE AND VEHICLE BODY STRUCTURE

(71) Applicant: SUBARU CORPORATION, Tokyo (JP)

(72) Inventor: Hiroyasu Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 387 days.

(21) Appl. No.: 18/165,607

(22) Filed: Feb. 7, 2023

(65) Prior Publication Data
US 2023/0264748 A1 Aug. 24, 2023

(30) Foreign Application Priority Data

Feb. 21, 2022 (JP) ................. 2022-024474

(51) Int. Cl.
| | | |
|---|---|---|
| *B62D 25/04* | (2006.01) | |
| *B62D 23/00* | (2006.01) | |
| *B62D 25/08* | (2006.01) | |
| *B62D 27/06* | (2006.01) | |
| *B62D 29/04* | (2006.01) | |

(52) U.S. Cl.
CPC .......... *B62D 25/04* (2013.01); *B62D 23/005* (2013.01); *B62D 25/08* (2013.01); *B62D 27/065* (2013.01); *B62D 29/043* (2013.01)

(58) Field of Classification Search
CPC ...... B62D 25/04; B62D 25/08; B62D 23/005; B62D 27/065; B62D 29/043; B62D 29/04

USPC ....... 296/193.06, 901.01, 209, 23.01, 3, 210
See application file for complete search history.

(56) References Cited

U.S. PATENT DOCUMENTS

| | | | | |
|---|---|---|---|---|
| 4,821,447 A | * | 4/1989 | Nakayama | ............. A01K 87/06 |
| | | | | 43/18.5 |
| 10,173,363 B2 | * | 1/2019 | Boveroux | ............... B29C 70/06 |
| 11,559,977 B2 | * | 1/2023 | Visini | ........................ B41F 5/24 |

FOREIGN PATENT DOCUMENTS

| | | |
|---|---|---|
| JP | 2013-193637 A | 9/2013 |
| JP | 2015-160524 A | 9/2015 |

* cited by examiner

*Primary Examiner* — Dennis H Pedder
(74) *Attorney, Agent, or Firm* — Smith, Gambrell & Russell, LLP

(57) ABSTRACT

A vehicle body pillar structure includes a cylindrical member and an outer layer member. The cylindrical member is formed from a carbon fiber-reinforced resin. The outer layer member is provided on an outer circumference of the cylindrical member and is formed from a carbon fiber-reinforced resin. The outer layer member includes a recessed groove provided on a surface of the outer layer member closer to the cylindrical member, recessed in a direction away from the cylindrical member, and extending along an axial direction of the cylindrical member. A fiber-reinforced resin is disposed in the recessed groove. The fiber-reinforced resin contains continuous fibers wound around pin members provided on both axial sides of the recessed groove and is oriented along the axial direction of the cylindrical member.

5 Claims, 3 Drawing Sheets

VEHICLE BODY PILLAR STRUCTURE AND VEHICLE BODY STRUCTURE

CROSS-REFERENCE TO RELATED APPLICATIONS

The present application claims priority from Japanese Patent Application No. 2022-024474 filed on Feb. 21, 2022, the entire contents of which are hereby incorporated by reference.

BACKGROUND

The disclosure relates to a vehicle body pillar structure and a vehicle body structure of a motor vehicle using a fiber-reinforced resin composite.

For weight reduction of a vehicle body of a vehicle such as a passenger vehicle, it has recently been considered to manufacture a vehicle body structural material using a fiber-reinforced resin typified by a carbon fiber-reinforced resin (hereinafter, "CFRP"). The structural material made of the fiber-reinforced resin has high rigidity and exhibits high strength particularly against a compressive stress or a tensile stress acting in a fiber orientation direction. Even when the structural material for the vehicle body is configured using the fiber-reinforced resin, it is desired to ensure rigidity to resist a collision, a joint strength for joining with other components of the vehicle.

Vehicle body structures formed from a carbon fiber-reinforced resin composite are proposed in, for example, Japanese Unexamined Patent Application Publication (JP-A) Nos. 2015-160524 and 2013-193637. In an example, JP-A No. 2015-160524 discloses a center pillar structure where an inner wall, in a vehicle width direction, of a B-pillar of a metal hollow frame that is a tensile side during input of a collision load of a side collision is reinforced with a CFRP reinforcing member. In addition, JP-A No. 2013-193637 discloses a vehicle cabin structure where a center pillar formed from the CFRP together with a roof arch is coupled to a side sill formed from the CFRP together with a floor member via a coupling member of an aluminum foundry piece.

SUMMARY

An aspect of the disclosure provides a vehicle body pillar structure including a cylindrical member and an outer layer member. The cylindrical member is formed from a carbon fiber-reinforced resin. The outer layer member is provided on an outer circumference of the cylindrical member and is formed from a carbon fiber-reinforced resin. The outer layer member includes a recessed groove provided on a surface of the outer layer member closer to the cylindrical member, recessed in a direction away from the cylindrical member, and extending along an axial direction of the cylindrical member. A fiber-reinforced resin is disposed in the recessed groove. The fiber-reinforced resin contains continuous fibers wound around pin members provided on both axial sides of the recessed groove and are oriented along the axial direction of the cylindrical member.

An aspect of the disclosure provides a vehicle body structure including a vehicle body pillar structure. The vehicle body pillar structure includes a cylindrical member and an outer layer member. The cylindrical member is formed from a carbon fiber-reinforced resin. The outer layer member is provided on an outer circumference of the cylindrical member and is formed from a carbon fiber-reinforced resin. The outer layer member includes a recessed groove provided on a surface of the outer layer member closer to the cylindrical member, recessed in a direction away from the cylindrical member, and extending along an axial direction of the cylindrical member. A fiber-reinforced resin is disposed in the recessed groove. The fiber-reinforced resin contains continuous fibers wound around pin members provided on both axial sides of the recessed groove and is oriented along the axial direction of the cylindrical member.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
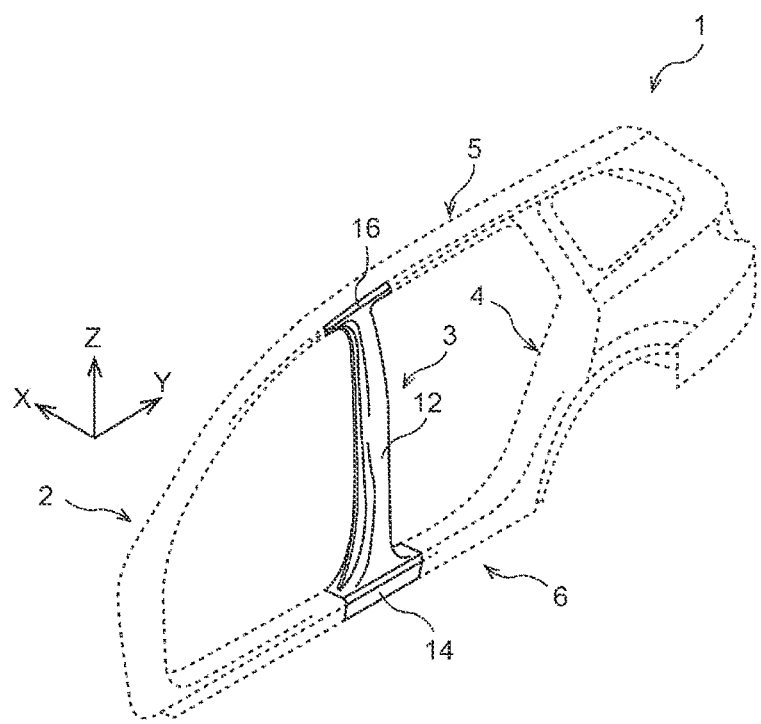
FIG. 1 is a schematic diagram illustrating overall configurations of a vehicle body side structure according to an embodiment.

When a CFRP is applied to a center pillar, it is desirable to maintain fiber continuity to make effective use of characteristics of the CFRP described above. In one example, it is desirable that reinforcement fibers are disposed as continuously as possible in a length or circumferential direction of the center pillar. Therefore, as with the metal center pillar described in JP-A No. 2015-160524, when a CFRP outer member and a CFRP inner member are each formed to have a hat cross-section and the outer member is bonded to the inner member simply in flanges on both ends, the fiber continuity at least in the circumferential direction of the center pillar may not be able to be maintained. Furthermore, simply bonding the outer member to the inner member simply in the flanges on both sides may result in insufficient bonding strength.

By contrast, a CFRP cylindrical member is disposed between an outer member and an inner member and the outer member and the inner member are joined to the cylindrical member. This can provide a closed cross-sectional structure capable of maintaining the continuity of the reinforcement fibers while ensuring the bonding strength. At this time, the inner member that serves to receive a load during an input of a collision load of a side collision is formed to have an uneven cross-section. This can increase a section modulus and rigidity. However, with the uneven cross-section, bonded surfaces of the members with the cylindrical member decrease, which may reduce the bonding strength. In addition, the inner member configured simply with the CFRP has a minor breaking strain and may not be able to prevent breaks sufficiently.

Therefore, it is desirable to provide a vehicle body pillar structure and a vehicle body structure capable of maintaining a bonding strength for bonding a cylindrical member to an outer layer member of a CFRP pillar and having high rigidity against a collision load of a side collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

An outline of a vehicle body structure with a vehicle body center pillar structure according to an embodiment will first be described.

FIG. 1 is a schematic diagram illustrating an appearance of a vehicle body side structure 1. The vehicle body side structure 1 illustrated in FIG. 1 is a schematic view of part of a left side structure of a vehicle. As illustrated in FIG. 1, in the present specification, a vehicle width direction may be denoted as an X direction, a vehicle body longitudinal direction (vehicle length direction) may be represented as a Y direction, and a vehicle height direction may be denoted as a Z direction.

The vehicle body side structure 1 is configured with a roof pillar 5, a rear pillar 4, a front pillar 2, a center pillar 3, a side sill 6, and the like. The roof pillar 5 extends above a vehicle cabin space of a vehicle along the vehicle longitudinal direction and forms a side of a vehicle roof. The side sill 6 extends below the side of the vehicle along the vehicle longitudinal direction.

The front pillar 2 has a lower end coupled to a front end of the side sill 6 and an upper end coupled to a front end of the roof pillar 5. The front pillar 2 forms a front that configures the vehicle cabin space of the vehicle and is disposed to support a side of a windshield. The rear pillar 4 has a lower end coupled to a rear end of the side sill 6 and an upper end coupled to a rear end of the roof pillar 5. The center pillar 3 has a lower end coupled to a center, in the vehicle longitudinal direction, of the side sill 6 and an upper end coupled to a center, in the vehicle longitudinal direction, of the roof pillar 5.

An opening for a front door is formed between the side sill 6, the roof pillar 5, the front pillar 2, and the center pillar 3. In addition, an opening for a rear door is formed between the side sill 6, the roof pillar 5, the rear pillar 4, and the center pillar 3. Each member configuring the vehicle body side structure 1 may be configured with multiple members. For example, each member may be configured such that an outer panel in the vehicle width direction is bonded to an inner panel in the vehicle width direction.

In this vehicle body side structure 1, a longitudinal direction of the center pillar 3 is the vehicle height direction, and the center pillar 3 is formed into a generally cylindrical shape. The center pillar 3 has a roof pillar coupling part 16 provided on the upper end, a side sill coupling part 14 provided on the lower end, and a pillar main body 12 located between the roof pillar coupling part 16 and the side sill coupling part 14. In the present embodiment, the center pillar 3 is formed from a carbon fiber-reinforced resin (CFRP).

Configurations of the center pillar 3 according to the present embodiment will next be described in detail.

Figure 2:
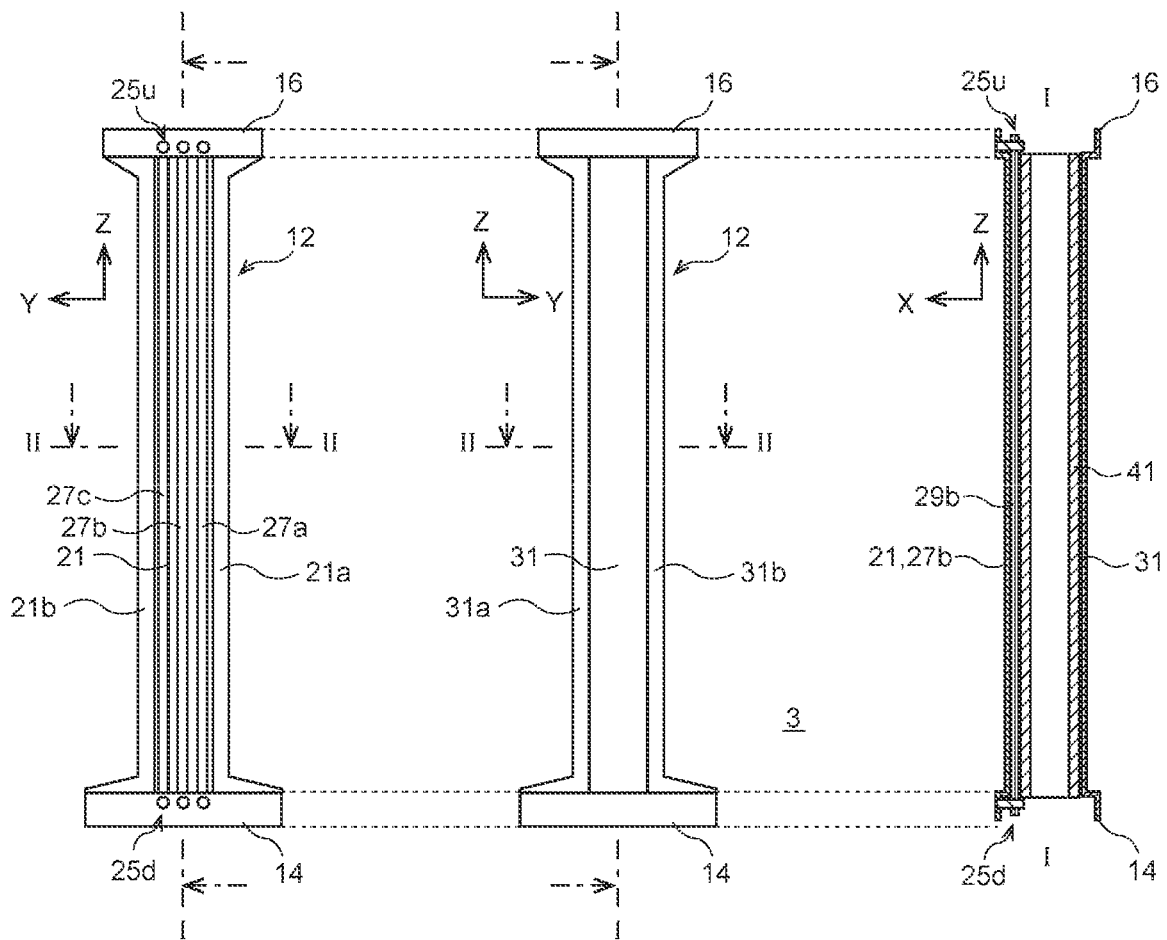
FIG. 2 is a plan view and a cross-sectional view illustrating configurations of a center pillar according to the present embodiment.
Figure 3:
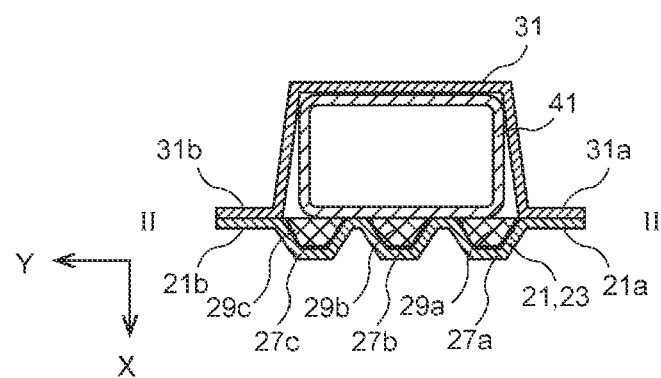
FIG. 3 is a cross-sectional view illustrating the configurations of the center pillar according to the present embodiment.
Figure 4:
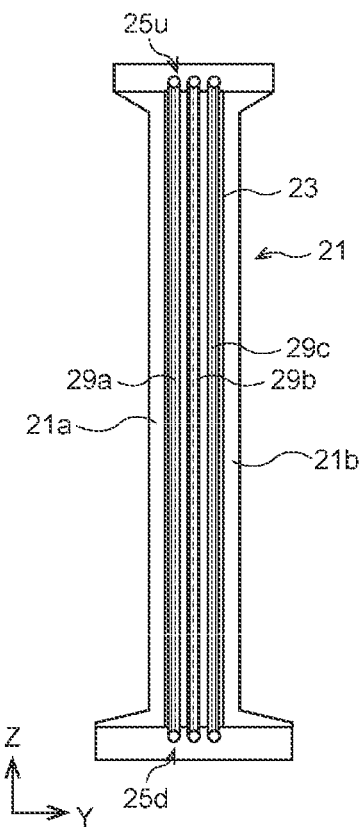
FIG. 4 illustrates an inner surface of an inner member of the center pillar according to the present embodiment.

FIGS. 2 to 4 illustrate the configurations of the center pillar 3 according to the present embodiment. The center pillar 3 illustrated in FIGS. 2 to 4 is a simplified view of the center pillar 3 of the vehicle body side structure 1 illustrated in FIG. 1. In FIG. 2, the center pillar 3 viewed from a vehicle body outer direction is at the center, the center pillar 3 viewed from a vehicle body inner direction is at the left, and an arrow view of an I-I cross-section is at the right. FIG. 3 is an arrow view of a II-II cross-section of the center pillar 3 illustrated in FIG. 2. FIG. 4 illustrates an inner surface of an inner member 21 of the center pillar 3.

The center pillar 3 includes the inner member 21 located inside of the vehicle body, an outer member 31 located outside of the vehicle body, and a cylindrical member 41 located between the inner member 21 and the outer member 31. The inner member 21, the outer member 31, and the cylindrical member 41 are each formed from the CFRP. Among these members, the inner member 21 and the outer member 31 correspond to outer layer members provided on an outer circumference of the cylindrical member 41.

The inner member 21 and the outer member 31 each have a part configuring the roof pillar coupling part 16 on an upper end and a part configuring the side sill coupling part 14 on a lower end. In addition, the inner member 21 has flanges 21a, 21b on both sides, in the vehicle longitudinal direction, of an intermediate member configuring the pillar main body 12. The outer member 31 has flanges 31a, 31b on both sides, in the vehicle longitudinal direction, of an intermediate member configuring the pillar main body 12. The cylindrical member 41 is formed into a hollow cylindrical shape to have a stereoscopic shape corresponding to a shape of the pillar main body 12.

The roof pillar coupling part 16 and the side sill coupling part 14 are configured with upper ends and lower ends of the inner member 21 and the outer member 31, respectively. The roof pillar coupling part 16 and the side sill coupling part 14 are formed into groove shapes fitted into the roof pillar 5 and the side sill 6, respectively and extending in the vehicle longitudinal direction. However, the shapes of the roof pillar coupling part 16 and the side sill coupling part 14 are not limited to the groove shapes.

The pillar main body 12 has a generally cylindrical shape with an axial direction extending along the vehicle height direction. The pillar main body 12 is configured as a compact having a cylindrical closed cross-section. That is, the cylindrical member 41 is put between the inner member 21 and the outer member 31, inner surfaces of the inner member 21 and the outer member 31 are bonded to an outer surface of the cylindrical member 41, and the flanges 21a, 21b of the inner member 21 are bonded to the flanges 31a, 31b of the outer member 31 (refer to FIG. 3). The inner member 21 and the outer member 31 are bonded to the cylindrical member 41 and the flanges 21a, 21b are bonded to the flanges 31a, 31b of the outer member 31 by, for example, an adhesive. The flanges 21a, 21b and the flanges 31a, 31b bonded to one another can be used as, for example, doorstops of the front door and the rear door.

The cylindrical member 41 is formed with a fiber-reinforced resin where carbon fibers are impregnated with a thermoplastic resin or a thermosetting resin. Examples of the thermoplastic resin include a polyethylene resin, a polypropylene resin, a polyvinyl chloride resin, an ABS resin (acrylonitrile-butadiene-styrene copolymer synthetic resin), a polystyrene resin, an AS resin (acrylonitrile-styrene copolymer synthetic resin), a polyamide resin, a polyacetal resin, a polycarbonate resin, a polyester resin, a PPS (polyphenylene sulfide) resin, a fluorocarbon resin, a polyetherimide resin, a polyether ketone resin, and a polyimide resin.

One or a mixture of two types or more of the thermoplastic resins can be used as a matrix resin. Alternatively, the matrix resin may be a copolymer of these thermoplastic resins. When the mixture of the thermoplastic resins is used, a compatibilizer may be added to the mixture. Furthermore, a fire retardant such as a bromine-based fire retardant, a silicon-based fire retardant, or red phosphorus may be added to the thermoplastic resin(s).

Examples of the thermosetting resin include an epoxy resin, an unsaturated polyester resin, a vinyl ester resin, a phenol resin, a polyurethane resin, and a silicon resin. One or a mixture of two types or more of the thermosetting resins can be used as the matrix resin. When one or more of these thermosetting resins are used, a curing agent and a reaction accelerator may be added as appropriate to the thermosetting resin(s).

The carbon fibers may include fibers oriented in the axial direction and those oriented in a direction crossing the axial direction at an appropriate ratio. A tensile stress generated during input of a collision load of a side collision is adjusted depending on an amount of the fibers oriented in the axial direction. A rigidity against the collision load of the side collision is adjusted and an absorbed amount of collision energy is adjusted depending on an amount of the fibers oriented in the direction crossing the axial direction. Since the cylindrical member 41 is the compact having the cylindrical closed cross-section, it is possible to maintain not only the continuity of the fibers in the axial direction (vehicle longitudinal direction) but also the continuity of the fibers in the circumferential direction around an axis. Therefore, it is possible to improve the rigidity against the collision load of the side collision.

The cylindrical member 41 may be a hollow tubular member or a solid member filled with a resin or the other appropriate material. Furthermore, the cylindrical member 41 may contain short fibers other than continuous fibers and may contain fibers other than carbon fibers as reinforcement fibers.

The outer member 31 is, like the cylindrical member 41, formed with the fiber-reinforced resin where carbon fibers are impregnated with the thermoplastic resin or the thermosetting resin. The carbon fibers may include fibers oriented in the axial direction and those oriented in a direction crossing the axial direction at an appropriate ratio. However, orientation directions of the carbon fibers may be one direction or different directions. Furthermore, the outer member 31 may contain short fibers other than continuous fibers and may contain fibers other than carbon fibers as reinforcement fibers.

As illustrated in FIG. 3, the outer member 31 of the center pillar 3 according to the present embodiment is formed to have a hat cross-section and the cylindrical member 41 is disposed in a recess region between the flanges 31a, 31b on both sides in the vehicle longitudinal direction. At least a bottom surface of the recess region of the outer member 31 is bonded to the outer surface of the cylindrical member 41.

The inner member 21 includes a base material 23 and filling parts 29a, 29b, 29c (hereinafter, collectively referred to as "filling parts 29" unless the members are distinguished from each other). The base material 23 is formed from the fiber-reinforced resin where carbon fibers are impregnated with the thermoplastic resin or the thermosetting resin. The carbon fibers may include fibers oriented in the axial direction and those oriented in a direction crossing the axial direction at an appropriate ratio. However, orientation directions of the carbon fibers may be one direction or different directions. Furthermore, the inner member 21 also may contain short fibers other than continuous fibers and may contain fibers other than carbon fibers as reinforcement fibers.

As illustrated in FIG. 3, the base material 23 of the inner member 21 has multiple recessed grooves 27a, 27b, 27c (hereinafter, collectively referred to as "recessed grooves 27" unless the grooves are distinguished from each other) provided on a surface of the inner member 21 closer to the cylindrical member 41, recessed in a direction away from the cylindrical member 41, and extending along the axial direction of the cylindrical member 41. In the example illustrated in FIG. 3, the base material 23 has the three recessed grooves 27a, 27b, 27c. Since the base material 23 has the multiple recessed grooves 27, a section modulus of the base material 23 increases and the rigidity against a bending moment acting during the input of the collision load of the side collision can be improved.

The filling parts 29 are disposed in the recessed grooves 27, respectively. The filling parts 29 are each configured with a fiber-reinforced resin containing continuous fibers wound around pin members 25u, 25d provided on axially both sides of each recessed groove 27 and oriented along the axial direction (refer to FIG. 4). The pin members 25u, 25d are rod members made of a metal such as iron or aluminum and secured to the base material 23. The pin members 25u, 25d may be any material that does not deform even by a heat treatment in processes of forming the inner member 21 and are not limited to the metal members.

Such filling parts 29 can be formed using, for example, a tailored fiber placement (TFP) method. At this time, a position (height) of a surface of the fiber-reinforced resin filled in each recessed groove 27 is desirably identical to a position (height) of an edge of the recessed groove 27 so that a uniform surface of the inner member 21 facing the cylindrical member 41 can be provided without height differences. It is thereby possible to make uniform the bonded surface of the inner member 21 bonded to the cylindrical member 41, increase a bonding area, and prevent a reduction in the bonding strength.

A breaking strain of the filling parts 29 is designed higher than a breaking strain of the CFRP configuring the inner member 21. For example, by using the fibers higher in coefficient of strain than carbon fibers as the continuous fibers configuring the filling parts 29, it is possible to design the breaking strain of the filling parts 29 higher than the breaking strain of the CFRP. While examples of such fibers include a mixture of each or one of glass fibers and aramid fibers, other fibers may be used. By using the resin higher in coefficient of strain than the CFRP as the resin configuring the filling parts 29, it is possible to design the breaking strain of the filling parts 29 higher than the breaking strain of the CFRP. While examples of such a resin include a mixture containing polyphenylene ether (PPE) resin, the other resin may be used.

The higher breaking strain of the filling parts 29 than that of the CFRP can reduce the risk of breaking the inner member 21 serving to receive the load during the input of the collision load of the side collision. It is, therefore, possible to produce an effect of absorbing the collision energy and securing safety in the vehicle cabin.

Furthermore, in the present embodiment, the pin members 25u, 25d of the inner member 21 may be used as part of a coupling structure coupling the center pillar (vehicle body pillar structure) 3 to a vehicle body structural member. In an example, the pin member 25u provided on a top of the center pillar 3 may be used as part of a coupling structure coupling the center pillar 3 to the roof pillar 5, and the pin member 25d provided on a bottom of the center pillar 3 may be used as part of a coupling structure coupling the center pillar 3 to the side sill 6.

Figure 5:
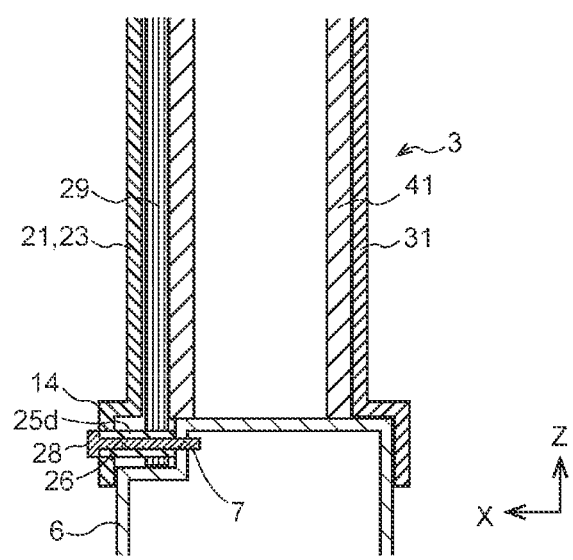
FIG. 5 illustrates a configuration example of using a pin member provided on a bottom of the center pillar according to the present embodiment as part of a coupling structure.

FIG. 5 illustrates a configuration example of using the pin member 25d on the bottom of the center pillar 3 as part of the coupling structure coupling the center pillar 3 to the side sill 6. FIG. 5 illustrates a state of coupling the bottom of the center pillar 3 corresponding to the cross-sectional view illustrated at the right in FIG. 2 to the side sill 6.

The pin member 25d penetrates the base material 23 of the inner member 21, and one axial end of the pin member 25d is exposed to an outside of the inner member 21. The pin member 25d has a bolt hole 26 formed along a shaft core and opened to both axial ends of the pin member 25d. A coupling bolt 28 serving as a coupling member that couples the center pillar 3 to the side sill 6 is inserted into the bolt hole 26. In addition, a bolt hole 7 is formed in the side sill 6 and the coupling bolt 28 is also inserted into the bolt hole 7. Therefore, the center pillar 3 is coupled to the side sill 6 by inserting the coupling bolt 28 into the bolt hole 26 of the pin member 25d and the bolt hole 7 of the side sill 6 and fastening the coupling bolt 28.

Although not illustrated, the pin member 25u provided on the top of the center pillar 3 is configured similarly to the pin member 25d and used as part of a coupling structure coupling the center pillar 3 to the roof pillar 5. In this way, the pin members 25u, 25d are used as part of the coupling structure coupling the center pillar 3 to the roof pillar 5 or the side sill 6. This makes it unnecessary to separately provide configurations for positioning the center pillar 3 relative to the roof pillar 5 or the side sill 6 and the coupling member coupling the center pillar 3 to the roof pillar 5 or the side sill 6.

Subsequently, an example of a method of manufacturing the center pillar 3 according to the present embodiment and a method of forming the inner member 21 using the TFP method will be described.

First, a well-known method such as a braiding method, a filament winding method, a sheet winding method, a lay-up method, a cold pressing forming method, or a hot pressing forming method is used to form the outer member 31 and the cylindrical member 41. The forming method of the outer member 31 and the cylindrical member 41 is not limited to a specific method.

In addition, CFRP prepregs are stacked using a forming die or the like to form a semi-molten intermediate base material corresponding to the base material 23 and having the multiple recessed grooves 27. At this time, the pin members 25u, 25d are provided on both axial sides of the recessed grooves 27. In a case of the inner member 21 illustrated in FIG. 4, the pin members 25u, 25d are provided with the axial direction made to match a thickness direction of the intermediate base material. The pin members 25u, 25d may be installed in advance when the intermediate base material is formed or may be disposed after the intermediate base material is formed. A forming method of the intermediate base material is not limited to a specific method.

Next, continuous fibers are wound around the two pin members 25u, 25d with respect to the recessed grooves 27 and fiber bundles are placed in the recessed grooves 27, respectively. Furthermore, the fiber bundles are fixedly sewn to the intermediate base material. A process of placing the fiber bundles and sewing the fiber bundles to the intermediate base material is carried out using the TFP method.

Next, the resin is poured into each recessed groove 27 where the fiber bundle is disposed to form the fiber-reinforced resin made from the fiber bundle and the resin in the recessed groove 27. The fiber-reinforced resin in the recessed groove 27 is then cured together with the intermediate base material, thus forming the inner member 21 having the filling part 29 in each recessed groove 27.

Next, the inner member 21 and the outer member 31 are bonded to the cylindrical member 41 with the adhesive or the like, and the center pillar 3 according to the embodiment can be thus obtained.

In the center pillar 3 according to the present embodiment, the inner member 21 has the multiple recessed grooves 27 extending along the axial direction. Therefore, the section modulus of the base material 23 increases and the rigidity against the bending moment acting during the input of the collision load of the side collision can be improved. Furthermore, the filling parts 29 formed from the fiber-reinforced resin including the continuous fibers disposed along the axial direction and having the breaking strain higher than the breaking strain of the CFRP are disposed in the recessed grooves 27 of the inner member 21, respectively. Owing to this, it is possible to reduce the risk of breaking the inner member 21 serving to receive the load during the input of the collision load of the side collision and produce the effect of absorbing the collision energy and securing safety in the vehicle cabin.

Moreover, in the center pillar 3 according to the present embodiment, the position (height) of each of the filling parts 29 filled in each of the recessed grooves 27 of the inner member 21 are made identical to the position (height) of the edge of the recessed groove 27. In addition, the uniform surface of the inner member 21 facing the cylindrical member 41 is provided without height differences. It is thereby possible to make uniform the bonded surface of the inner member 21 bonded to the cylindrical member 41, increase a bonding area, and prevent a reduction in the bonding strength.

Furthermore, the center pillar 3 according to the present embodiment is configured with the inner member 21, the outer member 31, and the cylindrical member 41, and the inner member 21 and the outer member 31 are bonded to surround the cylindrical member 41. Thus, the center pillar 3 having the cylindrical closed cross-section is structured, which can maintain the continuity of the reinforcement fibers in whichever direction, the axial direction or the circumferential direction. Therefore, the center pillar 3 capable of effectively exerting strength characteristics of the fiber-reinforced resin can be obtained.

Furthermore, in the center pillar 3 according to the present embodiment, the pin members 25u, 25d used when forming the filling parts 29 disposed in the recessed grooves 27 of the inner member 21 can be used part of the coupling structures coupling the center pillar 3 to the roof pillar 5 and the side sill 6. For this reason, the configurations for positioning the center pillar 3 with respect to the roof pillar 5 and the side sill 6 and the coupling member for coupling the center pillar 3 to the roof pillar 5 or the side sill 6 may not be provided separately.

While the embodiment of the technique of the disclosure has been described in detail with reference to the accompanying drawings, the disclosure is not limited to the embodiment. It is evident that a person having ordinary skill in the art to which the disclosure pertains could conceive of examples of various modifications or revisions within the scope of the technical concept set forth in the claims. It would be understood that these modifications or revisions naturally fall in the technical range of the disclosure. Furthermore, modes of combinations of the embodiment with the modifications naturally fall in the technical scope of the disclosure.

As described so far, according to the technique of the disclosure, it is possible to obtain the vehicle body center pillar structures capable of maintaining the bonding strength for bonding the cylindrical member to the outer layer member of the CFRP pillar and having the high rigidity against the collision load of the side collision.

The invention claimed is:

1. A vehicle body pillar structure comprising:
   a cylindrical member formed from a carbon fiber-reinforced resin; and
   an outer layer member provided on an outer circumference of the cylindrical member and formed from a carbon fiber-reinforced resin, wherein
   the outer layer member comprises a recessed groove provided on a surface of the outer layer member closer to the cylindrical member, recessed in a direction away from the cylindrical member, and extending along an axial direction of the cylindrical member, and
   a fiber-reinforced resin is disposed in the recessed groove, the fiber-reinforced resin containing continuous fibers wound around pin members provided on both axial sides of the recessed groove and being oriented along the axial direction of the cylindrical member.

2. The vehicle body pillar structure according to claim 1, wherein
   the pin members are used as part of a coupling structure configured to couple the vehicle body pillar structure to a vehicle body structural member.

3. The vehicle body pillar structure according to claim 2, wherein
   the pin members each have a bolt hole or comprise a coupling member, the bolt hole or the coupling member being configured to couple the vehicle body pillar structure to the vehicle body structural member.

4. The vehicle body pillar structure according to claim 1, wherein
   the continuous fibers of the fiber-reinforced resin filled in the recessed groove comprise fibers different from carbon fibers.

5. A vehicle body structure comprising
   a vehicle body pillar structure comprising:
      a cylindrical member formed from a carbon fiber-reinforced resin; and
      an outer layer member provided on an outer circumference of the cylindrical member and formed from a carbon fiber-reinforced resin, wherein
   the outer layer member comprises a recessed groove provided on a surface of the outer layer member closer to the cylindrical member, recessed in a direction away from the cylindrical member, and extending along an axial direction of the cylindrical member, and
   a fiber-reinforced resin is disposed in the recessed groove, the fiber-reinforced resin containing continuous fibers wound around pin members provided on both axial sides of the recessed groove and being oriented along the axial direction of the cylindrical member.

* * * * *